United States Patent [19]
Dolev et al.

[11] Patent Number: 5,550,873
[45] Date of Patent: *Aug. 27, 1996

[54] PROCESSING SYSTEM FOR USE AS A NETWORK NODE FOR PERFORMING ANONYMOUS TIME SYNCHRONIZATION IN A NETWORK

[75] Inventors: Danny Dolev, Jerusalem, Israel; Rüdiger K. Reischuk, Münster-Altheim, Germany; Hovey R. Strong, San Jose, Calif.

[73] Assignee: International Business Machines Corporation, Armonk, N.Y.

[ * ] Notice: The term of this patent shall not extend beyond the expiration date of Pat. No. 5,428,645.

[21] Appl. No.: 382,479

[22] Filed: Feb. 1, 1995

Related U.S. Application Data

[63] Continuation of Ser. No. 970,666, Nov. 3, 1992, Pat. No. 5,428,645.
[51] Int. Cl.⁶ ..................................... H04L 7/00
[52] U.S. Cl. ........................... 375/354; 375/356; 370/103
[58] Field of Search ..................... 375/354, 356, 375/359–361, 364, 365; 370/100.1, 103, 105, 105.1; 340/825.14

[56] References Cited

U.S. PATENT DOCUMENTS

| | | | |
|---|---|---|---|
| 2,986,723 | 5/1961 | Darwin et al. | |
| 3,940,558 | 2/1976 | Gabbard et al. | 178/69.5 |
| 4,142,069 | 2/1979 | Stover | 179/15 |
| 4,305,045 | 12/1981 | Metz et al. | 331/1 A |
| 4,677,614 | 6/1987 | Circo | 370/86 |

(List continued on next page.)

FOREIGN PATENT DOCUMENTS

| | | |
|---|---|---|
| 63-84228 | 4/1988 | Japan . |
| 2118868 | 5/1990 | Japan . |

OTHER PUBLICATIONS

Christian, F., Probabilistic Clock Synchronization, IBM Tech. Disclosure Bulletin, vol. 31, No. 2, Jul. 1988, p. 91.
Christian, F. et al., Decentralizing Technique Applied to Master–Slave Clock Synchronization, IBM Technical Disclosure Bulletin, vol. 33, No. 8, Jan. 1991, pp. 107–109.
Dolev et al., Dynamic Fault–Tolerant Clock Synchronization, IBM Research Journal, RJ8576 (77355) Jan. 16, 1992.

*Primary Examiner*—Stephen Chin
*Assistant Examiner*—Hai H. Phan
*Attorney, Agent, or Firm*—James C. Pinter

[57] ABSTRACT

A network node, such as a computer or processing system, is provided, for use within a network, the node including program code for synchronizing a local time maintained at the node with a reference time. Bursts of synchronization messages containing reference time stamps are transmitted over the network, or over a communication link, according to a predetermined protocol. The node receives and time stamps the messages. Thus, times according to a first time scale and a second time scale are obtained. The protocol defines temporal relationships between certain ones of the times. In accordance with the protocol, the node determines a difference between a first time according to one of the time scales and a time related to second and third times according to the other time scale. The node then updates its local time based on the difference. This synchronization method provides a well-defined upper bound of synchronization error, and allows the node to synchronize its internal time based only on information contained in the received messages and the internally generated local time stamp marks. No "round trip" or handshaking messages are necessary to define the needed temporal relationships between the times according to the first and second scales. Thus, it is not necessary that the reference time source know the identity of the node which is synchronizing itself. The node also maintains a global precision value, which estimates its time synchronization error, by resetting the value when the node is synchronized, and updating the value as the node operates. Responsive to the global precision exceeding various thresholds, the node requests resynchronization or sends synchronization messages based on its internal time.

14 Claims, 6 Drawing Sheets

U.S. PATENT DOCUMENTS

| | | | |
|---|---|---|---|
| 4,709,347 | 11/1987 | Kirk | 364/900 |
| 4,736,393 | 4/1988 | Grimes et al. | 375/107 |
| 4,860,285 | 8/1989 | Miller et al. | 370/100 |
| 4,893,318 | 1/1990 | Potash et al. | 375/109 |
| 4,918,652 | 4/1990 | Bennington et al. | 364/900 |
| 4,939,752 | 7/1990 | Literati et al. | 375/107 |
| 4,982,185 | 1/1991 | Holmberg et al. | 340/825.210 |
| 4,988,989 | 1/1991 | Goto | 340/825.21 |
| 5,001,730 | 3/1991 | Franaszek et al. | 375/107 |
| 5,052,029 | 9/1991 | James et al. | 375/107 |

PROCESSING SYSTEM FOR USE AS A NETWORK NODE FOR PERFORMING ANONYMOUS TIME SYNCHRONIZATION IN A NETWORK

This patent application is a continuation of the patent application, Ser. No. 07/970,666, filed Nov. 3, 1992, now issued as U.S. Pat. No. 5,428,645.

FIELD OF THE INVENTION

The invention generally relates to the field of network architecture and administration. More specifically, the invention relates to synchronization of internal times maintained by network nodes to a reference time source.

BACKGROUND OF THE INVENTION

In many applications, computers and processors maintain some form of real time for reference and sequencing purposes, and for the purpose of synchronization of activities with other computers or processors. In particular, in network and multiprocessing architectures, time synchronization between network nodes is important.

Generally, such devices maintain a register or other hardware or software structure which contains a representation of real time. This time representation can be either a literal time (such as Universal Time, Greenwich Mean Time, Eastern Standard Time, etc.) or some suitable form of logical time. In either case, the device maintaining the time representation updates the time internally on a real time basis. For instance, a processor might have a hardware timer which provides an interrupt at a known real time interval, measured in terms of system hardware clock cycles. Responsive to the interrupt, the processor updates its internal time in accordance with the known real time interval between interrupts.

In addition to maintaining and updating time internally, a processor or network node synchronizes its internal time with an external reference time source. A processor which has been synchronized to an external time source measures time in accordance with its internal hardware clock, which operates at a known frequency. Since the hardware clock frequency is inevitably not perfectly accurate, as time goes by the internal time maintained by a processor diverges from the external time with which the processor was previously synchronized. This time divergence is sometimes called "clock drift". Typically the processor's time drifts linearly from the external time. To prevent the clock drift from getting too large, from time to time the processor resynchronizes its internal time with the external reference time.

Various arrangements may be used for providing a reference time source. For instance, in a network comprising a plurality of nodes, one of the nodes serves as a repository of a reference time. All other nodes of the network are synchronized with that node's time.

Another time synchronization method involves reception of a reference time from a time source external to the network. Time services exist, which provide accurate time information for various purposes, including computer or network synchronization. One well known time source is WWV, which broadcasts a Universal Time signal. WWV and other similar time sources may be used to provide time synchronization to computers and processors. As described above, a processor which is synchronized with such a time source gradually drifts out of synchronization. Also, time sources such as WWV occasionally introduce "leap seconds" to synchronize their time with the motions of the planet Earth. To prevent error from accumulating due to drift and leap seconds, it is particularly desirable that a processor synchronize itself with an external time source from time to time in the normal course of its operation.

In architectures in which a predetermined node is a reference time source, or in which an external reference time source, such as a subscription time service, is coupled through a suitable communication link or interface to a predetermined node of a network, the predetermined node may be characterized as a master node.

In order for the master node to synchronize other nodes, the master node must know which other nodes it is responsible for updating, so that it can direct appropriate time update messages to those nodes. The master node sends synchronization messages to other nodes coupled to the network, which are slave nodes relative to the predetermined node. In addition, to guarantee that the slave nodes are properly updated, the master node must receive responses from each of the slave nodes. In this scenario, a handshaking scheme is employed, in which a message is sent and then an acknowledgement is awaited.

A handshaking scheme is also employed if a slave node sends a synchronization request message to the master node, and the master node responds by sending a synchronization message. The inaccuracy of time provided to a slave node in these scenarios is related to the total elapsed time for the handshaking sequence of messages. This inaccuracy is thus likely to be undesirably large, particularly if each slave receiving a synchronization message must separately acknowledge it.

A technique called Probabilistic Clock Synchronization has been used for synchronizing internal times of nodes with reference time from a designated reference node or from an external source. The technique is described in Christian, "Probabilistic Clock Synchronization", IBM Technical Disclosure Bulletin, Vol. 31, No. 2 (July 1988), p. 91. A slave node sends a synchronization request at a time t, according to its clock. A master responds with a message giving a time T, according to the master's time clock. The slave receives the response at a time t', according to its clock. It is thus established that the master's time T falls between the slave's times t and t'. The slave then updates its internal time in accordance with a difference between the reference time T and an internal time halfway between t and t'. The slave node's synchronization is accurate to within $$\frac{t'-t}{2}.$$

Thus, the technique described in Christian advantageously provides both synchronization and a quantitative estimation of the accuracy of synchronization, i.e., an upper bound of synchronization error. However, this technique has the drawback that the nodes must have knowledge of each other's IDs. Thus, the scheme is not well equipped to deal with nodes coming on line or going off line, or changes in network configuration, because the master node must be informed of these conditions and must integrate them into its records of the network configuration so that it will know which slave nodes it must communicate with. The scheme is also not well equipped to deal with multiple (redundant) external time sources, which are often present in large architectures including several linked networks. Additionally, the bidirectional message protocol requires a substantial amount of overhead. This is particularly true for the master node, which must go through the synchronization protocol for each slave node for which the master is responsible.

An alternative approach to network time synchronization may be used, in which the nodes maintain a peer relationship, rather than a master-slave relationship. One example of this arrangement is described in Dolev et al, "Dynamic Fault-Tolerant Clock Synchronization", IBM Research Report RJ8576 (Jan. 16, 1992). This Research Report describes systems in which, from time to time, processors in a network compare their internal times and synchronize based on an average time. Such systems can accommodate processors which fail and then recover, and processors which join the network while the network is in operation.

Additionally, the Research Report describes a method in which network processors periodically synchronize each other after an initialization. The synchronization algorithm is described in section 3 of the Report. Processors "sign" a synchronization message containing a reference time for synchronization, and send the message to each other. A message accumulates a plurality of signatures as it passes between processors. Thus this method has several drawbacks. First, it requires some overhead in maintaining knowledge of what other processors are in the network. Second, a large amount of time is consumed exchanging messages. Third, this method fails to provide an upper bound of inaccuracy of synchronization.

Another example of such a network time synchronization scheme is given in U.S. Pat. No. 5,001,730, issued to Franaszek et al, titled "Clock Synchronization Algorithm for Address Independent Networks". Each node in a network maintains an internal time, and keeps track of when a known time interval has elapsed. The node sends a synchronization message based on its internal time at one end of the interval, unless, prior to the end of the interval, it has received a synchronization message already sent from another node. Therefore, each time the known interval elapses, the nodes resynchronize. Often, after the first three or four resynchronizations, the network reaches a steady state in which one of the nodes, having the fastest internal clock, always sends the synchronization message.

In Franaszek, the precision with which each node synchronizes itself is a value given by an expression which takes into account an upper and lower bound of accuracy of the node's internal clock frequency and an upper and lower bound of a delay during which the message is transmitted from one node to another and is processed by the other node. Thus, the Franaszek arrangement has the drawback that its processing time, which might include a considerable delay due to other tasks being active at the time the synchronization message is received, increases the upper bound of inaccuracy of synchronization to produce an undesirably large value.

Yet another consideration relating to network time synchronization relates to operation in the presence of a system fault. A network node or link between nodes could fail. In addition, an external time source could fail, or a link between the external source and the network could fail. In a master/slave network, if a master node lost communication with the external source, it would no longer be able to synchronize other nodes. Also, if any node depended upon communication from or through another node for time synchronization, and that other node failed or communication with it was lost, then the first node would have no means for synchronization.

In summary, an important objective of a time synchronization scheme for network nodes is to provide a quantitative measurement of the upper bound of synchronization error for each synchronized node. This upper bound of synchronization error should be kept as small as possible, and should be achieved with the smallest practicable processing and memory overhead. Also, a time synchronization scheme should be able to accommodate multiple or redundant time sources. Finally, a method for time synchronization which achieves these objectives should also be able to function effectively in the event of a failure of a node, a link, or an external time source. Conventional master/slave oriented systems, such as probabilistic clock synchronization systems, provide estimates of synchronization error, but they require considerable overhead and bidirectional message traffic, leading to large upper bounds of synchronization error. Conventional anonymous synchronization schemes reduce overhead, but do not provide estimates of synchronization error.

SUMMARY OF THE INVENTION

It is thus an object of the invention to provide a method, apparatus, and computer program product for synchronizing a local time with a reference time which overcomes the above drawbacks of conventional methods, etc.

More specifically, it is an object of the invention to provide a method, apparatus, and computer program product which determines a time, according to one scale, which falls between two times, according to another scale, based on messages transmitted or broadcast from a source of one of the time scales, without requiring a "round trip", or handshaking message exchange arrangement between the transmitter of the messages and the receiver of the messages.

In order to overcome the above problems with conventional time synchronization methods, to achieve improved accuracy and reliability with reduced overhead, and to achieve these and other objects, there is provided in accordance with the invention a method for synchronizing a first time scale with a second time scale by identifying a first time, according to the first time scale, which falls between second and third times, according to the second time scale.

The method is based on reference time stamps according to one of the time scales, carried within messages sent by a repository of one of the time scales to a repository of the other of the time scales, and on local time stamp marks according to the other time scale, produced by the repository of the other time scale as it receives the messages. The messages are transmitted according to a predetermined protocol. Based on the protocol, temporal relationships are determined between events corresponding with the reference time stamps in the messages, i.e., the events of creation of the messages, and events corresponding with the local time stamp marks, i.e., the events of receipt of the messages.

Because of the predetermined protocol and the temporal relationships which follow from it, a first time according to one of the time scales, and second and third times according to the other time scale, are determined such that the first time falls between the second and third times. A difference is determined between the first time and a time related to the second and third times. Then, either the first time scale or the second time scale is updated to compensate for the difference between the first time and the related time. If, in a preferred embodiment, the related time is halfway between the second and third times, then the upper bound of synchronization error is half of the difference between the second and third times.

In a preferred embodiment, the first and second time scales are an internal time scale of a network node to be synchronized, and a reference time from a time source from which the node is to be synchronized. The time source could be external to a network containing the node, or could be another node of the network. The internal time scale may be the first time scale, and reference time scale could be the second time scale, or vice versa.

In the former case, for instance, messages bearing time stamps from the time source are sent in a burst. The characteristics of the network are known, such that, according to the predetermined protocol, a given maximum number k of messages can be in transit at any given time. When the node receives a message bearing a given reference time stamp, it then knows that the (k+1)th message of the burst may already have been sent, but the (k+2)th message has not been sent yet. Therefore, a local time at the node at the time the message was received falls in between the reference time stamps of the first and (k+2)th messages. The node receives these messages and extracts the time stamps from them.

The node therefore has a time from a first time scale, its internal time, and two times from a second time scale, that of the reference time source. The time from the internal time scale is known to fall between the two reference times. Of course, in an alternative form of the invention, a reference time could be found which falls between two local times. For instance, the local times of reception of first and (k+2)th messages of the burst fall before and after the reference time stamp of the (k+2)th message, respectively.

The node then adjusts its local time to compensate for a difference between its local time and the reference time. This is done by selecting a time related to the second and third times (in the second time scale), and determining a difference between the related time and the first time (in the first time scale). The time related to the second and third times of the second time scale may be determined in various ways. In a preferred embodiment, a time halfway between the two times is used. The greatest possible difference between the time according to the other scale and the time halfway between the times of the first scale is one half of the time interval between the two times of the first scale. This minimizes the greatest possible difference. In alternative embodiments, however, other related times could be used. For instance, if a time which fell between the second and third times but was closer to the second time than the third time were used as the related time, then the method would still work, but the maximum possible synchronization error would be the (somewhat larger) time between the related time and the third time.

Such a synchronization method overcomes the numerous drawbacks associated with the conventional methods described above. First, the method does not require a "round trip" or handshaking message exchange protocol, as was the case with conventional probabilistic time synchronization. Rather, the node which receives the messages synchronizes itself using only the information contained in the received messages and its own internally generated local time stamp marks. Therefore, there is no need for the node to identify itself to the reference time source as a recipient of the messages or to acknowledge the messages. Accordingly, one or more nodes receiving the messages can be anonymous to the sender of the messages.

As will be described, in a preferred embodiment of the invention, a predetermined protocol is used in which the reference time source requires an acknowledgement for each message it sends. However, the acknowledgement is only part of the predetermined protocol for the system. The temporal relationships between the first, second, and third times identified by the local node still depend only on the reference time stamps carried in the messages, and on the internally generated local time stamp marks. Therefore, the acknowledgement may be provided by a single, designated node which need not be involved in the time synchronization process, and anonymity of the node or nodes which synchronize their internal times based on the messages is preserved.

Also, the synchronization is made with respect to the known local time and the received reference time stamp or stamps. As a consequence, an upper bound of inaccuracy of synchronization may be obtained. The upper bound is obtained in such a way that a processing delay does not increase the inaccuracy of synchronization. The outcome of the step of estimating is the same regardless of the delay.

The method according to the invention readily functions in systems which have multiple or redundant reference time sources. The method works regardless of whether an external time source is used, or one or more of the nodes are used as reference time sources.

Time synchronization messages will, in many cases, pass through one or more intermediate nodes on a journey from a time source to a node to be synchronized. As a consequence, whenever messages pass from one node to another, logically adjacent node, these two nodes have a master/slave relationship relative to each other. The reference time stamps are received anonymously, so the method does not require that either the master node or the slave node have knowledge of the identity of the other. Also, there is no need for a slave node to send an acknowledgement back to a master node, so the overhead and processing burden is reduced. Finally, as will be discussed in more detail below, the method according to the invention is well suited for overcoming fault conditions in which synchronization messages are not forthcoming, and in which nodes are added to or taken away from the network architecture.

DESCRIPTION OF THE PREFERRED EMBODIMENTS

Figure 1:
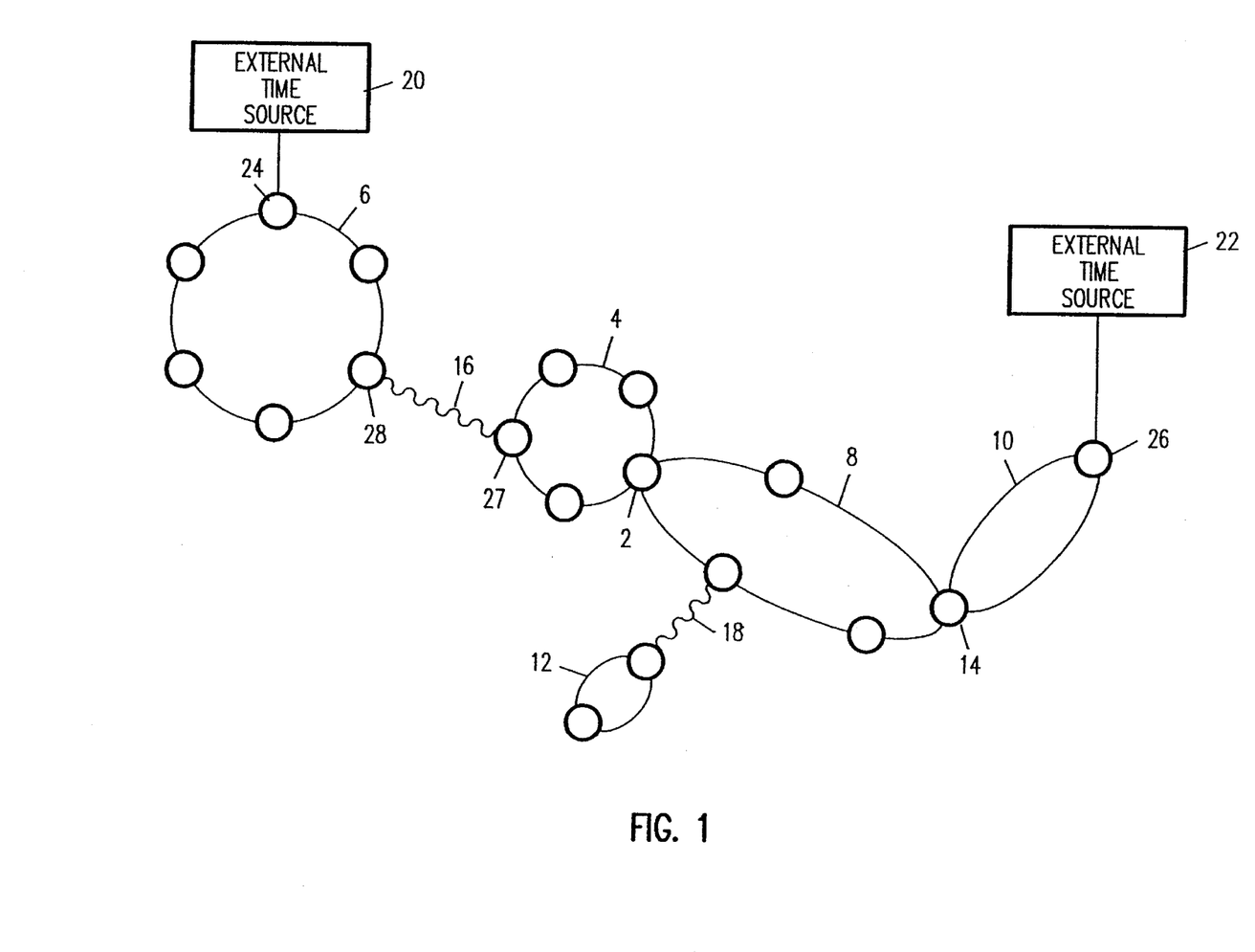
FIG. 1 is a schematic diagram of an exemplary network configuration in which a clock synchronization method in accordance with the invention is employed.

FIG. 1 is a schematic diagram of a communication system employing the time synchronization method according to the invention. A network node 2 is coupled for communication within an architecture including networks 4, 6, 8, 10, and 12. Each of these networks may be an Ethernet, a token ring network, or any other suitable communication network configuration. As shown, the node 2 is a member of the networks 4 and 8. The network 4 is coupled through a communication link 16 to the network 6, the network 8 includes a node 14 which is also a part of the network 10, and the network 8 is coupled to the network 12 through a communication link 18.

Two external reference time sources 20 and 22 are shown. While the time sources 20 and 22 are shown as being separate and distinct, it will be understood that they could both be the same source. For instance, the networks 6 and 10 could both subscribe to the same commercial time source.

The external source 20 is directly coupled to a node 24 in the network 6, and the external source 22 is directly coupled to a node 26 in the network 10. The nodes 24 and 26 synchronize their internal times directly from the respective sources 20 and 22. The nodes 24 and 26 then send synchronization messages to the remaining nodes in the networks 6 and 10, respectively. Nodes which are either coupled to communication links or are members of other networks send synchronization messages thereover. Ultimately, synchronization messages reach all nodes of all networks of the architecture shown.

This network architecture (FIG. 1) is only one example of a wide variety of architectures which can employ a time synchronization method according to the invention. In other configurations, a given node could be coupled to a single network, or to a plurality of networks limited in number only by the interfacing capacity of the node.

The following discussion will focus on the time synchronization of the node 2. To provide a broad illustration of the applicability of the invention, the node 2 is shown as being coupled to two networks and capable of receiving synchronization messages containing a reference time from either of the two reference time sources 20 and 22.

A master node coupled to an external time source obtains its reference time directly from the external source, and therefore has relatively little inaccuracy in its internal time. However, the slave nodes on the network receive their reference times in synchronization messages sent from the master node. Therefore, additional delay in transmission and processing increases the inaccuracy of the internal times maintained by the slave nodes. If one of the slave nodes is a member of a second network, it then acts as a master and sends a synchronization message to the other nodes on the second network, which are then slaves relative to it. Thus, the master/slave relationship is relative to the particular nodes under consideration.

As stated above, the upper limit of inaccuracy of synchronization of a given node is related to the latency time or distance required for time synchronization information to travel from the time source to the target node. This latency time or distance can be determined quantitatively, such as by estimating a number of milliseconds for a message to travel between two predetermined points in a network architecture. Alternatively, it can be represented logically. In general, if a message can be sent directly from one node to another, without requiring a change of form or transmission medium, then the nodes are a logical distance of 1 from each other. For instance, the nodes 24 and 26 could be defined as having a logical distance of 1 from the respective time sources 20 and 22, since they are, respectively, directly coupled to the time sources 20 and 22. Conversion of a message from one form to another for transmission over different media, such as from a first form for intra-network communication to a second for communication over a link, implies a greater logical distance.

Overall logical distances may be determined by counting logical distances between intermediate points. For instance, the node 2 has a logical distance of 3 to the time source 22, since the node 2 receives synchronization messages from the node 14 (logical distance 1), which receives its synchronization information from the node 26 (logical distance 1), which receives its synchronization information from the time source 22 (logical distance 1). On the other hand, the node 2 has a logical distance 4 from the time source 20, since the node 2 receives synchronization messages from a node 27 of the network 4 (logical distance 1), which receives synchronization messages over the communication link 16 from the node 28 of the network 6 (logical distance 1), which receives synchronization messages from the node 24 of the network 6 (logical distance 1), which receives synchronization messages from the external source 20 (logical distance 1).

The node 2 receives time synchronization messages from either the time source 20 or from the time source 22. Since the node 2 has a shorter logical distance from the time source 22 than from the time source 20, the upper limit of inaccuracy of synchronization with the time source 22 may be lower than that from the time source 20. However, other factors such as the characteristics of the respective nodes, networks, and communication links through which the time synchronization messages pass, latency times caused by other activity at these intermediate nodes, etc., also influence the respective upper limits of inaccuracy.

At various points within the illustrated network architecture, nodes assume a master/slave relationship with each other. For the purpose of this discussion, two nodes in communication with each other have a master/slave relationship if a first one of the nodes sends synchronization messages to a second one of the nodes. The first node is then called the master node, and the second node is called the slave node. It will be seen that the master/slave relationship is relative. For instance, the node 28 is a slave with respect to the node 24, but a master with respect to the node 27.

Also, the master/slave relationship is subject to change. As will be discussed below, situations such as loss of communication with an external source may cause a node to assume the role of a reference time source. That node then assumes the role of master with respect to other nodes, including, perhaps, a node with respect to which it had been a slave.

In accordance with the invention, time synchronization messages are sent anonymously. Thus, a node serving as a master of a network or communication link need not concern itself with the exact configuration of the network or link, the number of nodes on a network, their logical identities, etc. No separate protocol is employed for any given slave node, or any subset of the slave nodes. Also, the node serving as master need not receive separate acknowledgements from each slave node after receipt of the synchronization messages.

Given the preceding description of the network environment, the time synchronization method according to the invention will now be described. In accordance with the invention, a master node synchronizes time for the slave nodes by sending a burst, or series, of synchronization messages. Each synchronization message sent by the master node includes a reference time stamp based on the reference time provided to the master node by the external time source. Each slave, on receipt of a burst of time synchronization messages, synchronizes its internal time based on the time stamps provided in the synchronization messages.

More specifically, a slave node synchronizes itself by first performing the step of estimating a local time, that is, a time according to the slave node's time reckoning, which corresponds with a reference time which is determined in relation to the time stamps contained within the received synchronization messages. Then, the slave node performs the step of adjusting its local time in accordance with a difference between the estimated local time and the reference time, thereby synchronizing its local time with the reference time.

The step of estimating a local time is done as follows. The slave node maintains local time stamp marks reflecting time from its internal time. Upon receipt of a synchronization message in the node's receive buffer, the node associates a local time stamp mark with the received message, and stores both in a storage buffer. A plurality of messages may, from time to time, accumulate in a receive buffer of the slave node. Accordingly, the slave node tests the receive buffer after reading a received synchronization message. If the buffer is now empty, the slave node knows that the next synchronization message of the burst has not yet arrived.

Associating the local time with the received message may be done by immediately marking the received message with the current local time, or by inserting a regularly scheduled local time stamp mark with the received message in a suitable buffer. In the latter case, the node waits until the next regularly scheduled local time stamp mark is generated and then marks the message or messages most recently received with the local time stamp mark before proceeding with the synchronization.

Then, the node determines a difference between one of the time stamp marks and a time related to the reference time stamps from the messages. This is done by identifying two synchronization messages from the burst and one of the local time stamp marks such that the real time at which the local time stamp mark was generated lies between the real time of generation of the reference time stamps in the synchronization messages. Then a difference is calculated between that local time stamp mark and a time related to the reference time stamps contained within those two synchronization messages. Preferably, a reference time halfway between the reference times in the two synchronization messages is used to calculate the difference.

It should be noted, at this point, that the method according to the invention could also be practiced the other way around. That is, instead of determining that a local time (given in the local time stamp mark) falls between two reference times (given in the two synchronization messages), it could also be determined that a reference time given in a synchronization message falls between two local times given in two local time stamp marks.

Thus, the invention may be stated broadly as a method for synchronizing a first time scale with a second time scale, including the step of determining that a first time according to a first time scale falls between second and third times according to a second time scale. The times are selected based on messages sent from a repository of one of the time scales, i.e., a reference time, bearing reference time stamps according to the reference time scale. The messages are received by a local time repository, such as a network node, which associates local time stamps according to the other time scale, i.e., a local time scale. The messages are transmitted according to a predetermined protocol which is known to the node. Because of the characteristics of the protocol, temporal relationships are determined between the local time stamp marks and the reference time stamps within the messages. Thus, the first, second, and third times are identified at the node based only on the messages received. The node does not need to send any response messages in order to establish the temporal relationships. Therefore, the messages may be broadcast, and received anonymously by the node.

After the first, second, and third times are identified, a time is selected in relation to the second and third times, preferably halfway between them, and a difference is determined between the selected time and the third time. Finally, the local time is updated to compensate for the difference. Either way, the time synchronization is accurate to within half of the difference between the second and third times.

The method is preferably practiced as described above, to determine that time synchronization is accurate to within a given upper bound of error. However, the method may also be practiced by using a related time closer to one of the second and third times than to the other, resulting in a larger error bound. Preferably, the second and third times should be as close together as possible, to minimize the error bound. However, the method operates to identify a latest possible second time, and an earliest possible third time. Earlier second times or later third times may be used. In these latter cases, the interval between the second and third times will be larger, leading to a larger error bound, but the temporal relationship will be preserved.

Also, depending on factors such as the type of protocol used for transmission of the messages, the three times may be selected such that there is a high, but not certain, probability that the first time falls between the second and third times. Thus, a lesser accuracy resulting from the high but uncertain probability may be balanced by the likely reduced interval between the second and third times, bringing about a smaller error bound.

The discussion which follows will focus on an embodiment of the method in which one local time falls between two reference times. However, it will be understood that the method works in essentially the same way if one reference time is determined to fall between two local times.

The step of determining between which two synchronization message reference time stamps the local time stamp mark was made may be done in various ways. In accordance with a first preferred embodiment of the invention, it is done as follows.

The first preferred embodiment of the invention is predicated on a predetermined protocol in which a burst of synchronization messages is sent, there being a known upper bound k on the number of messages which can be in transit at any given time. Preferably, "in transit" is taken to mean either in a receive buffer, literally in transit through the network, or generated and time stamped but not yet literally placed in transit. The number of time synchronization messages sent in the burst exceeds k. A local time stamp mark is inserted after at least one, and preferably each, of the messages in the burst. While the first few messages of the burst may be detected in the node's received buffer and processed concurrently, in accordance with the invention at least one of the messages within the burst is time stamped soon enough after being received that the next message of the burst is not yet received, i.e., the receive buffer is empty following receipt and extraction of the at least one synchronization message. The local time corresponding to this time stamp is used for comparison with the reference times in the synchronization messages.

The local time stamp marks in the storage buffer are checked, to locate and select one which was produced at a time at which no remaining messages were in the node's receive buffer. Reference times provided in the most recent synchronization message prior to the selected local time stamp mark and in the (k+1)th synchronization message following the selected local time stamp mark are read. Since the value of k is known, and it is known that the synchronization messages were sent in a burst, it is conclusively determined that the selected local time stamp mark was made at a time between the reference times within the two synchronization messages.

A reference time corresponding to the local time stamp mark is then calculated in terms of those two reference times. The local time stamp mark is then compared with the calculated reference time. The difference between these two times is the degree to which the local time differs from the reference time produced by the external source. Accordingly, the local time is adjusted to compensate for that degree of difference.

A preferred way of estimating the reference time corresponding with the local time stamp mark in terms of the reference times within the synchronization messages is by splitting the difference between the two. That is, let S be the reference time corresponding with the local time at which the local time stamp mark was made, and let M and T be the reference times contained within the synchronization messages. Then, assuming that the reference time halfway between M and T is used, the reference time S and its upper bound of error are given by the expression $$S = \frac{M+T}{2} \pm \frac{T-M}{2}.$$

Of course, the selected reference time could be anywhere along the continuum between M and T. As long as it is somewhere between M and T, the method according to the invention produces synchronization to within an error bound. However, if the selected reference time is closer to M than T or vice versa, then the upper bound of synchronization error increases. For instance, if the selected reference time is chosen to be three fourths of the way from M to T, then $$S = M + \frac{3(T-M)}{4} \pm \frac{3(T-M)}{4}.$$

Therefore, it is preferred that the time halfway between M and T is chosen, to minimize the upper bound of synchronization error.

Figure 2:
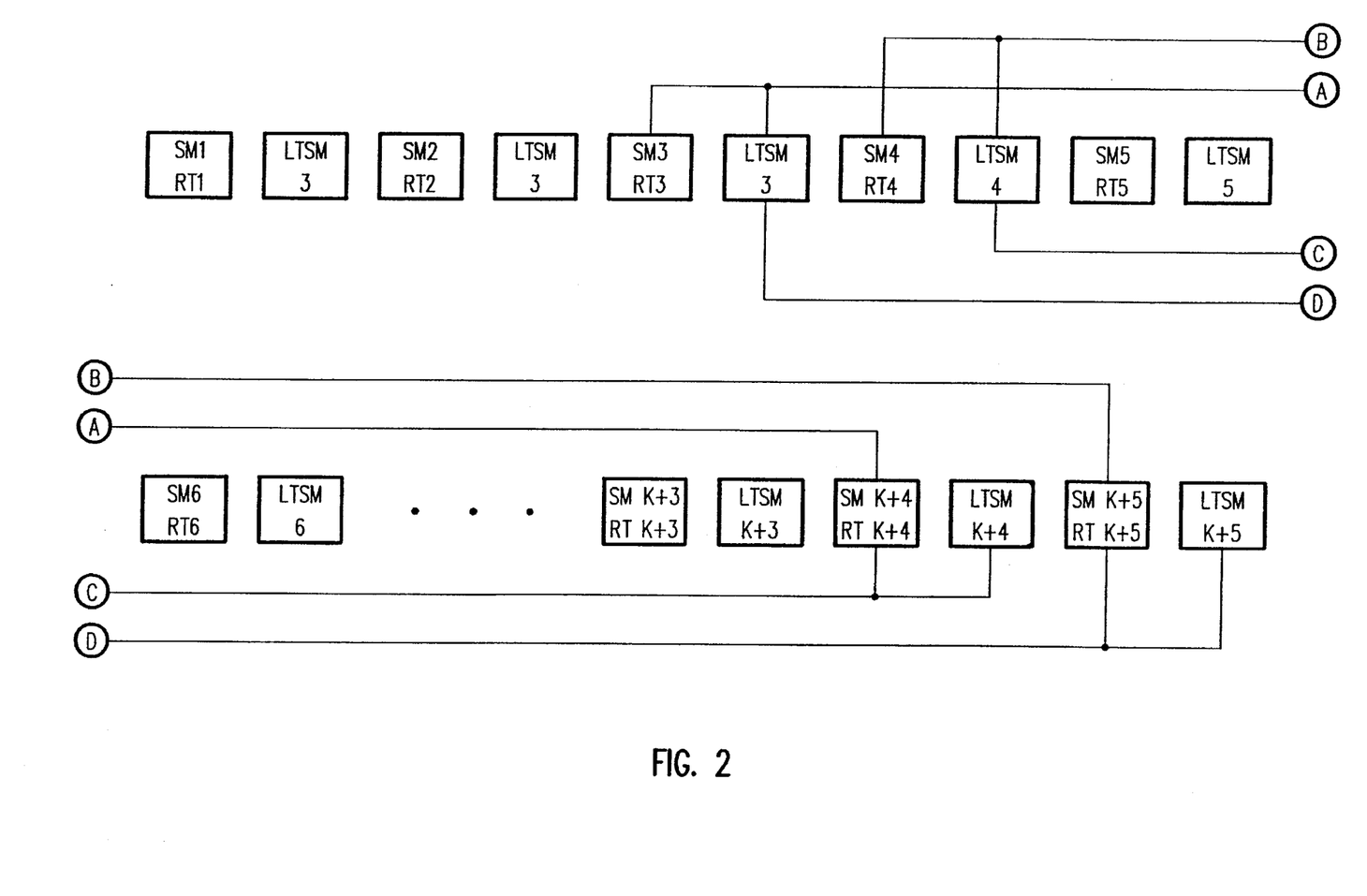
FIG. 2 is a snapshot of a storage buffer of a node which is executing a time synchronization method in accordance with a first embodiment of the invention.

FIG. 2 is a snapshot of a storage buffer of a node such as the node 2 of FIG. 1, containing a burst of synchronization messages received by the node and the local time stamp marks buffered along with the received synchronization messages. Time moves forward from left to right, i.e., buffered items farther to the right are more recently received or generated. To illustrate sufficient items for explaining the invention, the buffered items are shown in two rows, the lower row including the more recent items. In the discussion that follows, various ones of the items are designated first, second, and third as per the definitions given above. These items are connected with lines. Where the lines go over from the upper row to the lower row, the necessary line breaks are designated by letters, e.g., A, B, etc.

As stated above, the detailed description of the invention will focus on a preferred embodiment in which a local time, given by a local time stamp mark, is determined to be between two reference times, contained within two synchronization messages. However, it will be understood that, if one reference time is determined to be between two local times given by two local time stamp marks, the same analysis applies.

FIG. 2 shows a node storage buffer in which many synchronization messages from a burst have been received. The synchronization messages are shown schematically as SMn, where n indicates the n-th message of the burst. Each message SMn contains a reference time stamp RTn, representing a reference time at which the message was sent by the master node. Each local time stamp mark LTSMn is that assigned to the message at the time it was read from the slave node's receive buffer.

For the purpose of this illustration, the synchronization messages and the local time stamp marks are identified by consecutive integers. However, it is understood that in practice the messages and marks contain reference time stamps according to the reference time used by the master node for slave node synchronization, and local time stamp marks according to the local time maintained by the Slave node, respectively, and that these times may be any suitable actual or logical time. If the local time and the reference time operate according to two different time scales, such as two different logical times, it is understood that suitable conversions are made.

In the particular case illustrated, the first three synchronization messages of the burst, SM1 through SM3, were found in the node's receive buffer at the same time. Thus, each one has received a local time stamp mark LTSM3. From then on, each message of the burst was received, assigned a local time stamp mark, and buffered promptly after it arrived at the node, so that the receive buffer was empty after each message was read out. A suitable means, such as a flag associated with each buffered local time stamp mark, is used to indicate whether the receive buffer was empty at the time the local time stamp mark was made.

These first few local time stamp marks are shown in FIG. 2 for ease in comprehension, although in a preferred embodiment they may be omitted. That is, a local time stamp mark is preferably buffered only when the receive buffer is empty after the message is read out. In the illustrated case, the marks LTSM3 following the messages SM1 and SM2 would be omitted, and only the mark LTSM3 following the message SM3 would be present.

In accordance with the invention, the node accumulates synchronization messages and local time stamp marks as shown in FIG. 2. It then tests the local time stamp marks to determine whether, after the synchronization message corresponding with the local time stamp mark was read, the node's receive buffer was empty. The first local time stamp mark for which this is true is the mark LTSM3 following the synchronization message SM3. Since LTSM3 was made before the next synchronization message SM4 was received, it is then known that, at the time LTSM3 was made, at most SM4 through SM(k+3) were in transit, and SM(k+4) was not yet in transit. Therefore, it is established that the local time at which LTSM3 was made is between the reference times of the time stamps RT(3) and RT(k+4) in the respective messages SM(3) and SM(k+4). These three items are joined by the line A.

Accordingly, the reference time to be used for the comparison is estimated based on the reference times RT(3) and RT(k+4), and the local time is adjusted based on a difference between that estimated reference time and the local time in the mark LTSM3.

Further in accordance with the invention, a second attempt to achieve synchronization may be made if a first attempt fails. The local time stamp mark LTSM3 and the reference time stamps RT(3) and RT(k+4) are used for the first attempt, as described above. If, for any reason, this attempt fails, advantage is taken of the fact that a local time stamp mark is buffered after each message of the burst. For the second attempt, the next local time stamp mark LTSM4 and the reference time stamps RT(4) and RT(k+5) in the synchronization messages SM(4) and SM(k+5) are used. These items are connected by the line B. Likewise, a number of further attempts may be made, depending on the total number of synchronization messages that are sent in the burst.

Alternatively, a reference time stamp from a message is taken as the first time, and two local time stamp marks are taken as the second and third times. For instance, if the reference time stamp RT(k+4) is the first time, then the message SM(k+4) which contains it was in transit, at most, during the time period in which the preceding k messages, SM4 through SM(k+3), were being assigned their local time stamp marks. Therefore, the mark LTSM3 associated with RT3 is known to have been made before RT(k+4), and LTSM3 or any earlier local time stamp mark can serve as the second time. The mark LTSM(k+4), which was assigned to the message SM(k+4) is known to have been made after RT(k+4), since it was assigned responsive to receipt of the message SM(k+4). Therefore, LTSM(k+4) or any later local time stamp mark can serve as the third time. These items are joined by the line C in FIG. 2. Also, if synchronization is not successful, through a similar process the times LTSM4, RT(k+5), and LTSM(k+5), which are joined by the line D, can be used.

Figure 3:
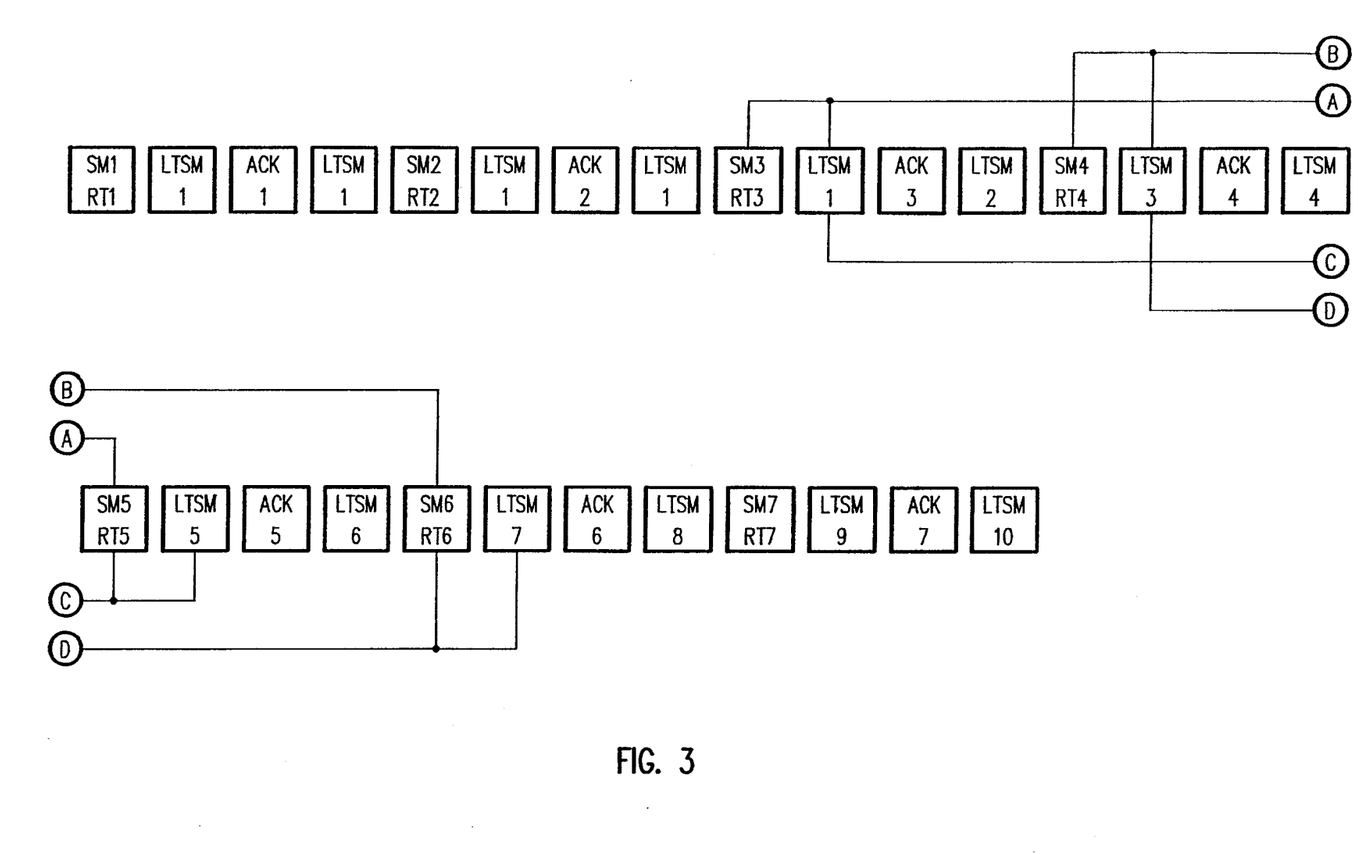
FIG. 3 is a snapshot of a storage buffer of a node which is executing a time synchronization method in accordance with a second embodiment of the invention.

A second preferred way of performing the step of estimating the correspondence between a local time and a reference time is illustrated by another buffer snapshot, shown in FIG. 3. The embodiment of FIG. 3 employs a predetermined protocol different from that of FIG. 2. In this embodiment, the reference time source which sends the synchronization messages requires that each message be acknowledged before it sends the next message. This acknowledgement requirement does not obviate the advantageous anonymity provided in accordance with the invention. That is, it is not necessary that each node receiving the messages send an acknowledgement, or identify itself in so doing. Rather, all that is necessary is that the reference time source receive a single acknowledgement of some kind before it sends the next message. Thus, in a preferred implementation of a system and method in accordance with this aspect of the invention, one of the network nodes is designated as an acknowledger of the synchronization messages sent by the master node. This arrangement accommodates a master node which requires an acknowledgement of a transmitted synchronization message, to provide increased certainty that the time synchronization scheme is working. However, since it is not necessary for all of the slave nodes to acknowledge the synchronization message, nor for the master node to take note of acknowledgements from all slave nodes, this arrangement maintains the advantageous anonymity and simple message protocol of the first preferred embodiment of the invention.

Referring now to FIG. 3, there is shown a snapshot essentially similar to FIG. 2, containing a sequence of messages and local time stamp marks buffered by the slave node. As before, time moves forward from left to right, and two lines of buffered messages are shown in order to provide a sufficiently long sequence of messages for clear illustration of the invention. Additionally, however, FIG. 3 shows messages transmitted by the node designated for acknowledging synchronization messages. For purposes of illustration, the node which buffered the messages as shown is not the designated acknowledger, but the acknowledger would buffer the messages, including its own acknowledgements, in a similar fashion. Acknowledgements, shown as "ACK1", ACK2", etc., were received by the slave node in the course of having been transmitted from the acknowledging node back to the master node. It will be seen that, according to an exemplary acknowledging protocol, the master node transmits a message only after it has received an acknowledgement from the message previously sent.

As before, synchronization messages transmitted by the master node are designated "SM1", etc., and local time stamp marks buffered by the slave node are designated "LTSM1", etc. In the example shown, a synchronization message SM1 is transmitted by the master node. An acknowledgement ACK1 is sent by the acknowledging node after it received the message SM1. Only after the master node receives ACK1 does it send SM2.

The slave node receives all of these messages in its receive buffer, and saves each one, along with a local time stamp mark. As with the example of FIG. 2, the first few messages were already in the receive buffer when the slave node checked it. Thus, SM1, ACK1, SM2, ACK2, and SM3 are all time stamped with LTSM1. Subsequent SM and ACK messages were each read from the receive buffer and time stamped before the next messages were received. Accordingly, the local time stamp marks for the subsequent messages are numbered consecutively.

Either one local time stamp mark and two reference time stamps, or one reference time stamp and two local time stamp marks, may be used as the three times having the temporal relationship. The former case will be described first.

The slave node selects the first local time stamp mark which was made after a received message was read from the receive buffer, leaving the receive buffer empty. This is the mark LTSM1 following SM3. Thus, at the time this mark was made, the next synchronization message SM4 may already be in transit, but the following message SM5 is not yet transmitted. Thus, it is established that the local time given by the mark LTSM1 falls between the reference times RT3 and RT5. These two reference times are used as described above to estimate a reference time corresponding with the local time LTSM1, and the local time is adjusted as described above. If, for any reason, synchronization cannot be realized from these three times, a similar temporal relationship is established between RT4, LTSM3, and RT6.

In the latter case, the synchronization message SM5, which contains the reference time stamp RT5, is selected as the first time. The local time stamp mark LTSM5, or any subsequent local time stamp mark, then can serve as the third time, because these times are known to be subsequent to RT5. Because of the acknowledgement requirement of this protocol, the reference time stamp RT5 could already have been made at the time the node stamped the message SM4 with the local time stamp mark LTSM3, but the local time stamp mark LTSM1, which was used to mark the earlier message SM3, must pre-date RT5. Therefore, the three times LTSM1, RT5, and LTSM5 have the specified temporal relationship. Again, if for any reason synchronization is not established, a temporal relationship is then established between the times LTSM3, RT6, and LTSM7 as described here.

In this second embodiment of the invention, because ACKs are not counted, it may be said that k=1. As an illustration, it will be seen that, after receipt of the message SM3 but before receipt of ACK3, ACK3 could be in transit, but SM5 could not be in transit yet. Earlier second times and later third times may be identified similarly, although the resulting larger intervals between the second and third times bring about larger error bounds.

Also, it is possible to establish with probability, rather than certainty, that a given first time falls between second and third times. For instance, RT5 is definitely subsequent to LTSM1, while RT4 may or may not be subsequent to LTSM1. A time related to RT3 and RT4, such as a time halfway between them, can nevertheless be used for comparison with LTSM1. A narrower window between the second and third time results, although there is a possibility that the first time (LTSM1) does not fall between the second time (RT3) and the third time (RT4). Whether such an alternative method can desirably be used depends on factors such as the type of network used. For instance, in a token-type network such as a token ring network, it is possible that two messages, such as an ACK and the nest synchronization message, might be simultaneously in transit in different parts of the network. Thus, the likelihood that the temporal relationship between three messages, such as RT3, LTSM1, and RT4, does not hold is increased. On the other hand, in a network such as Ethernet, only one message is in transit at a time. Therefore, these three times can be used with greater likelihood that the temporal relationship holds. Therefore, the smaller window results in a synchronization with a smaller error bound.

As discussed above, the difference between the local time in the mark LTSM1 and the reference time calculated with respect to the reference time stamps RT3 and RT5 in the synchronization messages SM3 and SM5, preferably, the time halfway between them, is estimated, and the slave node adjusts its local time accordingly.

A time synchronization method as discussed above lends itself well to various schemes for coping with problem situations such as excessive clock drift without synchronization. For instance, in accordance with another aspect of the invention, a node includes programming for keeping a running estimation of its synchronization error. The slave node tests for error conditions in terms of the growing value of the estimated synchronization error, compared with various threshold error values, and takes appropriate actions depending on which threshold value is exceeded.

One effective way of maintaining an estimated synchronization error is to monitor the length of time since the slave node was last synchronized. Over time, the slave node's internal time diverges from the reference time. Typically, the divergence is linearly related to the elapsed time. Thus, a given elapsed time since the last synchronization is used to calculate a time differential by which the local time has drifted away from the reference time.

In a preferred embodiment of the invention, each node maintains a data structure including five (or, optionally, six) fields. This data structure is also sent as part of any synchronization message. A node which receives a synchronization message and synchronizes itself therefrom updates its internal data structure from that contained within the message, as will be discussed below. The five fields are (1) TIME, (2) PRECISION, (3) SOURCE, (4) DISTANCE, and (5) NAME. The optional sixth field is (6) COUNT.

The TIME field contains the local time maintained at the node. This time is synchronized with time received in time synchronization messages, as described above, and is updated thereafter as part of the normal operation of the node.

The PRECISION field contains a global precision, i.e., an upper bound on the inaccuracy between the local time and the time at the reference time source. The rate of increase of inaccuracy is determined in terms of clock drift caused by imprecision of the node's internal clock frequency. In typical operation, this field is set to an initial value when the node is synchronized, and is increased in a predetermined fashion, such as linearly, as time goes by afterward. The global precision is to be contrasted with a local precision, which is an upper bound on the inaccuracy between the node and its immediate master, that is, the master node a logical distance of 1 from the node under consideration, which sends synchronization messages to it. In the case of the node 2 in FIG. 1, its immediate master would be either the node 27, from which the node 2 receives synchronization messages relating to the time source 20, or the node 14, from which the node 2 receives synchronization messages relating the time source 22. The global precision is related to a sum of the local precisions of all other nodes between the node and the reference time source, between which the time synchronization messages pass.

The SOURCE field contains information associated with a reference time source. In keeping with the anonymity of the synchronization process (discussed above), the source need not be an identity of a particular node, or a description of its location within the network architecture. However, the potential time sources (external/internal, etc.) are ranked, and a synchronization messages includes the rank of the time source which sent it. A node receiving a synchronization message checks the rank of the source of the message before determining whether to synchronize itself based on the reference time stamp within the message. This check is described in more detail below. In the case of a node having access to more than one reference time source, such as the node 2 of FIG. 1, the node updates the source field to identify the reference time source from which the node is currently synchronized. Thus, the SOURCE field at the node 2, and the SOURCE field contained within any synchronization messages which the node 2 receives, identifies either the reference time source 20 or the reference time source 22.

The DISTANCE field is a logical distance (discussed above) between the node and the reference time source given in the SOURCE field.

The NAME field identifies the immediate source of the synchronization. That is, the NAME field of the node 2 identifies either the node 14 or the node 27, depending on which of these nodes the most recent synchronization messages came from. As discussed above, in a network architecture which includes a plurality of reference time sources, a given node could be synchronized by messages transmitted by a plurality of different nodes. Appearing below is a discussion of methods by which the given node determines whether to synchronize itself from a given burst of received synchronization messages. Essentially, the given node tests whether its global precision would improve by synchronizing to these messages.

The COUNT field is optional. Its utility is primarily in relation to synchronization messages. It is used to identify which message of the burst it is contained within. That is, the first message of a burst has a COUNT of 1, the second has a COUNT of 2, etc. Alternatively, the COUNT field may also identify the total number of messages of the burst. In this case, the first message has a COUNT of "1 of 10", the second message has a COUNT of "2 of 10", etc. The COUNT field is useful to determine how many more messages of the burst are coming. If insufficient messages are coming for the synchronization attempt to work, the node makes this determination using the COUNT field, discards the messages and tries to synchronize again later. This is explained in more detail below.

In accordance with the invention, a slave node includes a synchronization error threshold for actively requesting a burst of synchronization messages. When the differential exceeds a first predetermined threshold, the slave node sends a synchronization request message. The master node then responds to the request by sending a burst of synchronization messages as described above.

In the system of FIG. 1, the node 2 sends a synchronization request message over one of the networks 4 and 8. Preferably, a node coupled to a plurality of networks, such as the node 2, sends the request over the network from which the last synchronization was received, i.e., the network leading to the reference time source currently identified in the node's SOURCE field. The synchronization request message is received by the node (14 or 27) which provided the node 2 with the most recent burst of synchronization messages. That node is identified in the node 2's NAME field.

The node 2 also maintains a second threshold, greater than the threshold for the current source. When this second threshold is exceeded, the slave node 2 sends synchronization request messages over all networks to which it is coupled.

Also in accordance with a preferred embodiment of the invention, the above-discussed thresholds are given in terms of the logical distance given in the node's DISTANCE field. That is, in each case the global precision from the PRECISION field is compared with a product of a numerical threshold value and the logical distance from the DISTANCE field. Calculating the thresholds in this manner takes into account the fact that the upper bound of inaccuracy is related to the logical distance of the node from the reference time source.

Referring now to the flowcharts of FIGS. 4 through 6, it will be explained how a node in accordance with the invention synchronizes itself, requests resynchronization, and determines when it needs to assume the role of reference time source.

In the preferred embodiment illustrated, the node's processor is programmed to take various actions relating to time synchronization responsive to certain conditions. The conditions and the corresponding actions will be described in detail with reference to FIGS. 4–6. It will be understood that the node also performs other processing and communication tasks unrelated to the invention. All other activities of the node's processor are schematically represented by step 50, labelled "WAIT FOR NEXT THING TO DO". Other steps in FIGS. 4–6 represent tests for conditions relevant to the invention and actions taken responsive to those conditions (to be described in detail below).

Skilled programmers will be aware of various software architectures for implementing tests for the conditions and routines for performing the corresponding actions. For instance, the node's processor may be interrupt driven, wherein the conditions interrupt the processor and cause it to execute interrupt service routines to take the appropriate actions. Alternatively, tests for the conditions may be made on a polled basis as part of an executive or background routine, which calls task level service routines. The exact details of implementation of these tests are not critical to the invention. The method illustrated is based on processor interrupts due to timeouts, where time count values have been set to coincide with projected times required for various conditions to take place.

Figure 4:
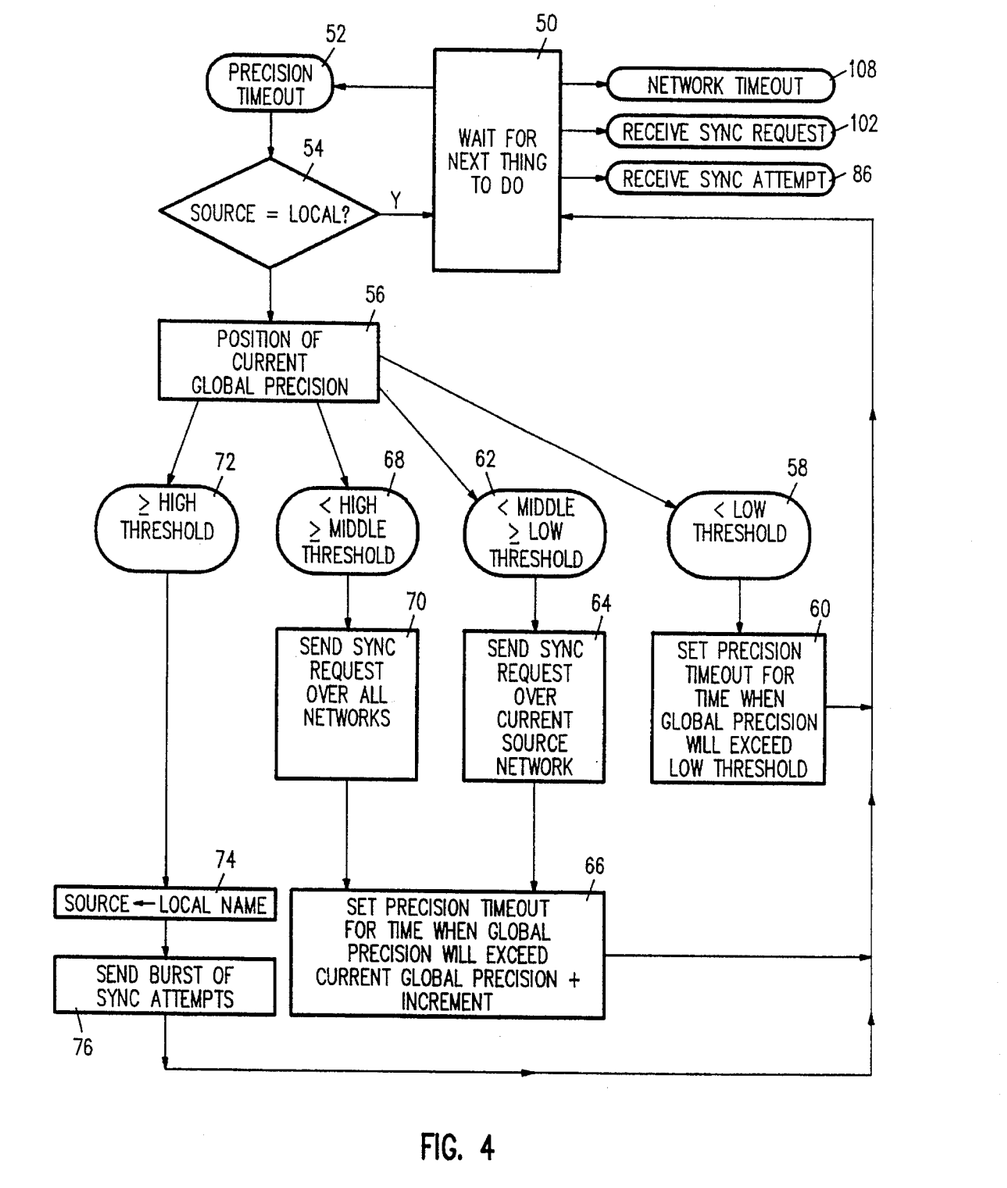
FIGS. 4 through 6 are flowcharts showing the operation of a network node in accordance with further aspects of the method of the invention, including how the node processes synchronization messages, requests resynchronization, and assumes the role of reference time source if synchronization messages are not received.

Referring first to FIG. 4, there is shown a condition 52, precision timeout. A precision timeout takes place when a timeout, previously set, expires. In the illustrated implementation, at some point in the past, the system was in a first state. It was estimated that, after a first given time elapsed, a second state would be reached. At that time, the timeout value was set for the first given time. The first given time has now elapsed, so the second state will be tested for. In the discussion to follow, various program operations will be shown setting the timeout value.

From the WAIT step 50, step 52 indicates that the precision timeout has occurred. A test 54 is made to determine whether the reference time source is local, i.e., whether the node's SOURCE field identifies itself as the reference time source. If so, then the test for precision timeout is moot.

Each of the conditions, and the respective actions, will be discussed. First, it is assumed that the past event was a successful synchronization based on a burst of synchronization messages received over a first network to which the node is coupled. Given the initial global precision and a reasonably well-known rate of clock drift, it was estimated that after a first timeout interval, absent another synchronization burst, the node's global precision would exceed a first (low) threshold of inaccuracy. At the time the node was synchronized, the first timeout interval was set (step 100 in FIG. 5).

Now, the first timeout interval has expired. The node was previously in the synchronized state, so it now checks to see if the global precision has exceeded the first threshold (step 56). If it has not (step 58), then a new timeout value is set (step 60), again based on an estimated time until the global precision exceeds the first threshold. The processor then returns to step 50.

If the node was previously in the synchronized state, but the global precision does exceed the first threshold (step 62), then the node sends a synchronization request (step 64) over the network from which it received the most recent synchronization. This is the network which also includes the node identified in the NAME field. Having sent a first synchronization request, the node now enters a second state. If no response to the request is received within the time it takes for the global precision to exceed a second threshold, the node will enter a third state. However, the node sets the timeout value for an incremental value (step 66) in the expectation that another node will respond to the request by sending a burst of synchronization messages.

If the node receives a synchronization burst, the timeout value will be changed (step 100, described below) and steps 62, 64, and 66 will not be repeated. However, if no response to the request is received, the node will repeat these steps, perhaps several times, until eventually the global precision exceeds a second (middle) threshold (step 68). When this happens, the node requests synchronization over all networks to which it is coupled (step 70). The node then enters the third state, and waits for synchronization from anywhere. Again, it sets an incremental timeout value (step 66) and waits.

Again, if the node receives a synchronization burst, it returns to the first state and sets the timeout value back to the original value. If it does not receive a synchronization burst, it goes through steps 68, 70, and 66, perhaps several times, until eventually the global precision exceeds a third (high) threshold (step 72). At this point, the node concludes that no synchronization messages are going to be received from any other node, so the node enters a fourth state, assuming the role of reference time source itself. It sets its SOURCE field to identify itself as the reference time source (step 74), and sends a burst of synchronization messages (step 76) using its own internal time and the values stored in its own data structure.

Figure 5:
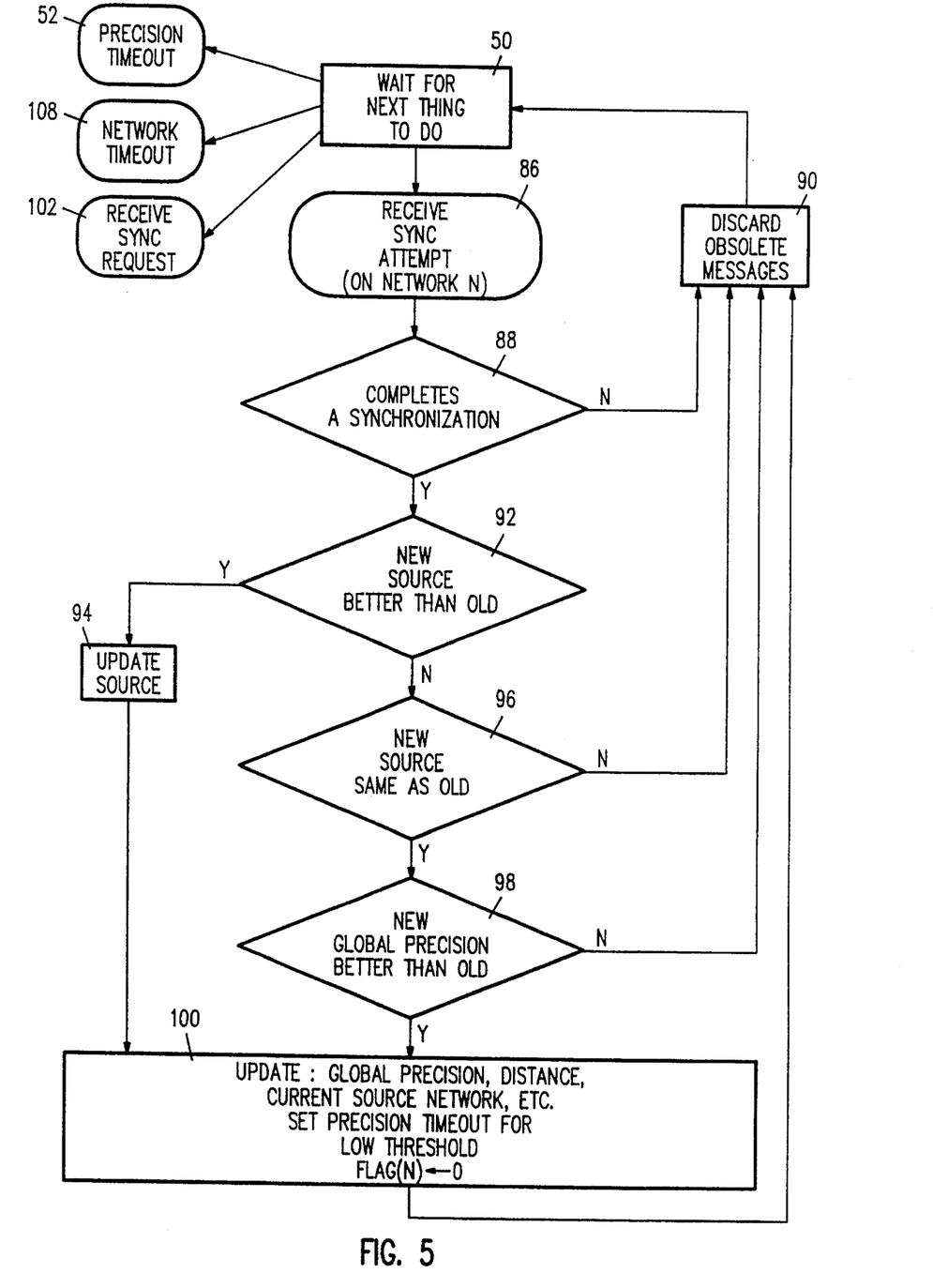

Referring now to FIG. 5, there is shown a flowchart illustrating what a node does when it receives a burst of synchronization messages. This flowchart will be better understood in light of the foregoing discussion relating to FIGS. 2 and 3.

As with FIG. 4, FIG. 5 shows step 50, which schematically represents any processing unrelated to the method of the invention. Step 86, "RECEIVE A SYNCHRONIZATION ATTEMPT (ON NETWORK N)", includes receiving a message from a burst of synchronization messages and buffering the messages. Placement of local time stamp marks may take place in step 86 as well, but in a preferred embodiment, it takes place as a background activity, i.e., as part of step 50. After completion of step 86 and the local time stamp mark placement, the node's storage buffer looks like those shown in FIGS. 2 and 3.

After the node receives a synchronization attempt (step 86), it identifies a local time stamp mark and first and second synchronization messages as described above in connection with FIGS. 2 and 3. Step 88, "COMPLETES A SYNCHRONIZATION", tests whether local time stamp mark(s) and message(s) having the required temporal relationship needed for the synchronization process have been found.

As stated above, no messages or local time stamp marks whose times of origin are prior to those which pertain to the described method need to be kept in the storage buffer. Rather, they may be discarded. Similarly, if for any reason the node fails to identify the mark and the messages required for synchronization in step 88, the obsolete messages which will not be needed for a future synchronization attempt are discarded (step 90).

If, on the other hand, the attempt is successful, a further test (step 92) is made to determine whether the synchronization message originated from a source higher in rank than the last source. This is done by comparing the SOURCE field of the synchronization message with the SOURCE field stored in the node's data structure. If the former source is higher in rank, the node synchronizes itself from the messages. Step 94 is executed to update the node's data structure to identify the new source.

If the source of the messages is not higher in rank than the node's current SOURCE field, then step 96 is executed to test whether the rank of the source of the synchronization message is the same as the source stored in the node's SOURCE field, i.e., whether the message is from the same ultimate source from which the node received its last successful synchronization. If not, then the source of the message has a lower rank. If the new source is lower in rank than the old source, the node declines to synchronize itself from the message. Instead, it goes to step 90 and discards the message without attempting to synchronize from it.

If the new source is the same as the old source (step 96), the node uses the message for synchronization. There is no need to update the source, so step 94 is not executed. Before updating, the node makes a final test (step 98), to determine whether the sum of the global precision contained within the appropriate field of the message and the local precision computed for this synchronization is better than the global precision the node is currently maintaining for its internal time. If not, no improvement in global precision will result from attempting synchronization from the message, so the node proceeds to step 90 and discards the message. If, on the other hand, there would be an improvement in global precision, the node proceeds to step 100.

In step 100, the node makes a full update of all appropriate fields of its data structure. It updates its global precision, logical distance, and current source network, as well as updating its internal time in accordance with the procedure described above. Additionally, it sets its precision timeout for the low threshold, so that step 58 will be executed if no subsequent resynchronization messages are received before the low threshold of inaccuracy of global precision is exceeded. Also, a flag FLAG(N) is cleared. The use or this flag will be explained in connection with FIG. 6, below. Finally, the node discards the messages, which are no longer needed (step 90), and resumes routine operation, including waiting for the next condition requiring action (step 50).

Figure 6:
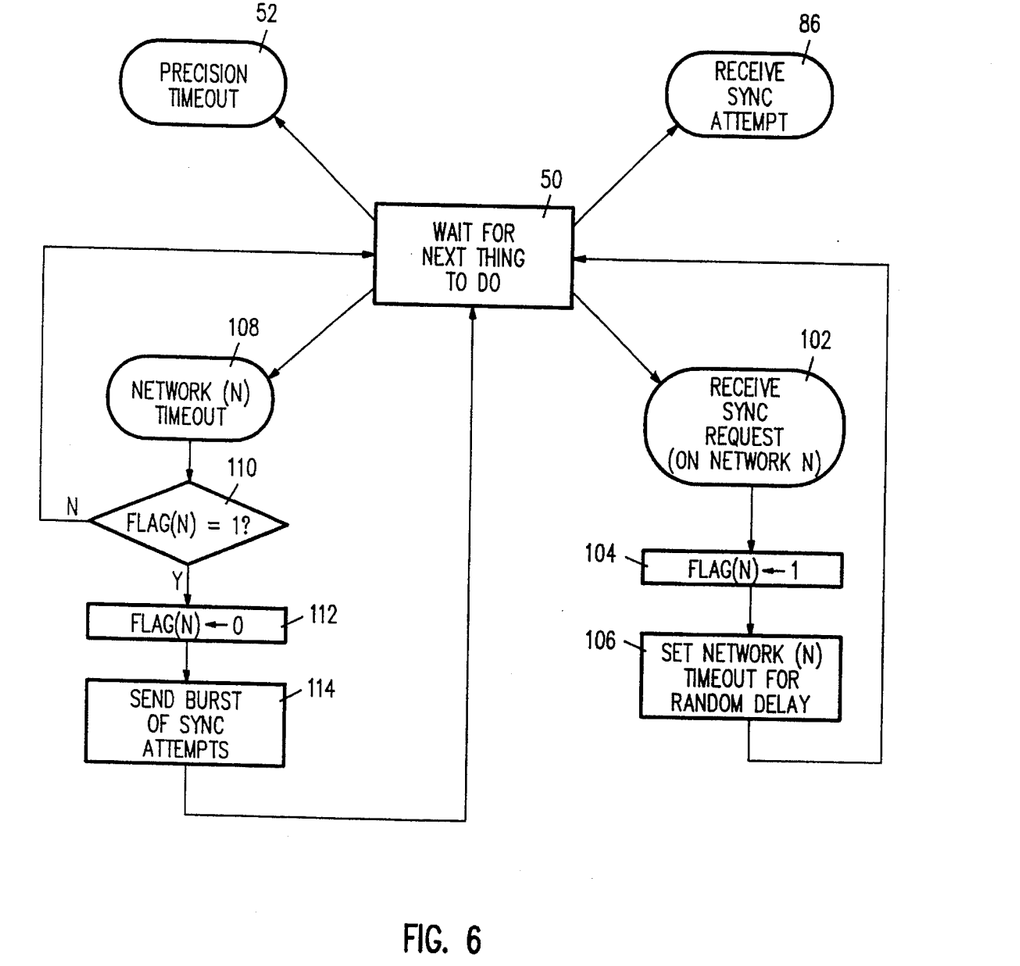

Finally, FIG. 6 is a flowchart showing additional activities performed by a node when it has assumed the duties of reference time source. When the node receives a synchronization request (step 102) sent by another node which is executing step 64, step 70, or the equivalent, the node sets a network timeout flag FLAG(N) (step 104). The node also sets a network timeout to a random delay period (step 106). The node then returns to step 50. This delay serves partly to avoid collisions on the network, and also to reduce the likelihood that a great many other nodes which have received the synchronization request will all try to send a synchronization burst at the same time. If they did, every node receiving the bursts would have to sort out which messages from which transmitting node it would try to synchronize from.

If the node receives a burst of resynchronization messages before the random delay period elapses, it processes the resynchronization attempt as described above, starting with step 86. If the resynchronization succeeds, the node clears the network timeout flag as part of step 100, discussed above. If not, the flag remains set.

When the network timeout random delay period elapses (step 108), the node tests the network timeout flag (step 110). If the flag has been cleared as part of the resynchronization process in step 100, the node proceeds directly from step 110 to step 50, and waits for the next thing to do. If the flag is still set, the node has not yet been synchronized. It proceeds to step 112, and clears the flag. Also, the node sends a burst of synchronization messages (step 114), using its internal data structure in the messages, but substituting its own name in the NAME field. As was seen in step 60, the node set its global precision and logical distance to 0 as part of the process of assuming the role of reference time source. Thus, these values appear in the messages the node sends in step 114.

In summary, the time synchronization method in accordance with the invention permits nodes in complex network architectures to synchronize themselves from bursts of synchronization messages. It is not necessary for nodes to have detailed information about network architecture or the identities of other nodes, except for a ranking which is used to determine which node or nodes will first attempt to assume the role of master in case of a loss of communication with an external source or a master node coupled to an external source. A node receives broadcast synchronization messages and synchronizes itself without acknowledging the messages, unless it is the designated node which sends ACK messages. Therefore, it is possible for a node to synchronize itself without revealing its identity to any other node.

Also, since time synchronization is made relative to a local time stamp mark which is known to have been made between the reference times given in two reference time stamps, processing delay causes no increase in the upper bound of imprecision of the resulting time synchronization. Thus, a time synchronization method in accordance with the invention provides advantageous improvement in accuracy of synchronization. Finally, through the use of the methods exemplified in the flowcharts of FIGS. 4–6, the method in accordance with the invention works for nodes newly added to the network, and provides advantageous fault tolerance. A system according to the invention is decentralized, i.e., there is no dependence on a single or fixed master node.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A network node comprising:

means for maintaining an internal time scale;

means for receiving synchronization messages containing reference time stamps which denote times of respective events according to a reference time scale, the synchronization messages having been sent according to a predetermined protocol;

means for marking received synchronization messages with local time stamp marks which denote respective events of receipt of the synchronization messages according to the internal time scale, in accordance with the predetermined protocol, thereby defining temporal relationships between certain ones of the reference time stamps and certain ones of the local time stamp marks;

means for identifying a first time according to a first scale and second and third times according to a second time scale, the first time scale being one of the internal time scale and the reference time scale, the second time scale being the other of the internal time scale and the reference time scale, the first, second, and third times being identified in accordance with the defined temporal relationships between the events denoted by the times, such that the event denoted by the first time falls between the events denoted by the second and third times;

means for determining a difference between the first time and a time related to the second and third times; and means for updating the internal time scale to compensate for the difference between the first time and the time related to the second and third times.

2. A network node as recited in claim 1 wherein the means for determining a difference includes means for selecting the related time as a time halfway between the second and third times.

3. A network node as recited in claim 1, wherein:

k is an upper limit of the number of the synchronization messages which can, at any given time, be in transit through the network; and the means for identifying includes:

means for selecting a local time stamp mark associated with a first one of the messages as the first time;

means for identifying a reference time stamp contained within one of (i) the message associated with the selected local time stamp mark and (ii) a message received prior thereto as the second time; and means for identifying a reference time stamp contained within a message received at least (k+1) messages subsequent to the message associated with the selected local time stamp as the third time.

4. A network node as recited in claim 1, wherein:

k is an upper limit of the number of the synchronization messages which can, at any given time, be in transit through the network; and the means for identifying includes:

means for selecting one of the synchronization messages, which contains a first reference time stamp, wherein the first reference time stamp is to be the first time;

means for selecting a local time stamp mark associated with a synchronization message received at least (k+1) synchronization messages prior to the selected synchronization message as being the second time; and means for selecting a local time stamp mark associated with one of (i) the selected synchronization message and (ii) a synchronization message received subsequent thereto as being the third time.

5. A network node as recited in claim 1, wherein:

each synchronization message must be acknowledged before a subsequent synchronization message may be placed in transit; and the means for identifying includes:

means for selecting a local time stamp mark associated with a first one of the synchronization messages as the first time;

means for identifying a reference time stamp contained within a synchronization message received at least two synchronization messages prior to the first synchronization message as the second time; and means for identifying a reference time stamp contained within a synchronization message received subsequent to the first synchronization message as the third time.

6. A network node as recited in claim 1, wherein:

each synchronization message must be acknowledged before a subsequent synchronization message may be placed in transit; and the means for identifying includes:

means for selecting a first reference time stamp contained within a first one of the synchronization messages as being the first time;

means for identifying a local time stamp mark associated with a synchronization message received before the synchronization message associated with the selected local time stamp mark as the second time; and means for identifying a local time stamp mark associated with a synchronization message received at least two synchronization messages subsequent to the synchronization message associated with the selected local time stamp as the third time.

7. A network node as recited in claim 1 further comprising means for maintaining global precision information representing an upper bound of inaccuracy of synchronization between the node's internal time scale and the reference time scale.

8. A network node as recited in claim 7 wherein the means for maintaining includes:

means for resetting the global precision information to an initial value responsive to updating of the internal time scale by the means for updating;

means for changing the global precision information at a rate corresponding with a worst case clock drift of the internal time scale of the node.

9. A network node as recited in claim 7 further comprising means for requesting synchronization if the global precision information exceeds a first threshold.

10. A network node as recited in claim 9 further comprising means for requesting synchronization over a plurality of networks if the global precision information exceeds a second threshold.

11. A network node as recited in claim 10 further comprising means for sending synchronization messages if no messages are received during a first selected time interval after the global precision information exceeds a third threshold.

12. A network node as recited in claim 11 further comprising means for sending synchronization messages if, after reception of a synchronization request, no message is received during a second selected time interval.

13. A network node as recited in claim 7 further comprising:

means for maintaining a record of a rank of a reference time source from which the node previously received a synchronization message based on which the node synchronized its time; and means for synchronizing responsive to receipt of a synchronization message containing rank information indicating that the reference time source of the received synchronization message has a rank greater than the rank of the source maintained in the record by the means for maintaining.

14. A network node as recited in claim 7 further comprising:

means for maintaining a record of a global precision of a source from which the node previously received a synchronization message based on which the node synchronized its time; and means for synchronizing responsive to receipt of a synchronization message containing global precision information indicating that the source of the received synchronization message has a global precision greater than the global precision of the source maintained in the record by the means for maintaining.

* * * * *